(12) United States Patent
Citterelle et al.

(10) Patent No.: US 7,676,605 B1
(45) Date of Patent: *Mar. 9, 2010

(54) METHODS AND APPARATUS FOR BRIDGING A BUS CONTROLLER

(75) Inventors: Kevin Bradley Citterelle, Coquitlam (CA); Ngo Bach Long, Vancouver (CA); David Victor Hobbs, Surrey (CA)

(73) Assignee: Teradici Corporation, Burnaby, BC (CA)

(*) Notice: Subject to any disclaimer, the term of this patent is extended or adjusted under 35 U.S.C. 154(b) by 352 days.

This patent is subject to a terminal disclaimer.

(21) Appl. No.: 11/535,394

(22) Filed: Sep. 26, 2006

Related U.S. Application Data

(63) Continuation-in-part of application No. 11/278,378, filed on Mar. 31, 2006.

(60) Provisional application No. 60/726,419, filed on Oct. 12, 2005, provisional application No. 60/669,212, filed on Apr. 6, 2005.

(51) Int. Cl.
*G06F 3/00* (2006.01)
*G06F 13/28* (2006.01)
*G06F 15/167* (2006.01)

(52) U.S. Cl. .................. 710/5; 710/22; 710/24; 709/212

(58) Field of Classification Search .......... 710/5, 710/22, 24; 709/212
See application file for complete search history.

(56) References Cited

U.S. PATENT DOCUMENTS

| | | | |
|---|---|---|---|
| 5,933,611 A * | 8/1999 | Shakkarwar | 710/100 |
| 6,061,687 A | 5/2000 | Wooten | |
| 6,272,499 B1 | 8/2001 | Wooten | |
| 6,564,271 B2 * | 5/2003 | Micalizzi et al. | 710/39 |
| 6,636,929 B1 | 10/2003 | Frantz et al. | |
| 6,671,756 B1 | 12/2003 | Thomas et al. | |
| 6,701,380 B2 | 3/2004 | Schneider et al. | |
| 6,708,247 B1 | 3/2004 | Barret et al. | |
| 6,735,658 B1 | 5/2004 | Thornton | |
| 6,748,473 B1 | 6/2004 | Shatas et al. | |
| 7,114,154 B1 * | 9/2006 | Crohn | 718/100 |
| 2002/0149617 A1 | 10/2002 | Becker | |
| 2002/0199047 A1 | 12/2002 | DuPont et al. | |
| 2003/0079061 A1 * | 4/2003 | Azzarito et al. | 710/5 |
| 2003/0191878 A1 | 10/2003 | Shirley | |
| 2003/0217254 A1 * | 11/2003 | Page et al. | 713/2 |
| 2004/0015551 A1 | 1/2004 | Thornton | |
| 2004/0080526 A1 | 4/2004 | Thornton | |
| 2004/0083302 A1 | 4/2004 | Thornton | |
| 2005/0216896 A1 * | 9/2005 | Doleh | 717/136 |

(Continued)

OTHER PUBLICATIONS

"1394 Open Host Controller Interface Specification", Promoters of the 1394 Open HCI, Release 1.1, 210 pages, Jan. 6, 2000.

(Continued)

*Primary Examiner*—Niketa I Patel
(74) *Attorney, Agent, or Firm*—Moser IP Law Group

(57) ABSTRACT

A method for coordinating descriptor lists updates between a host computer and a client computer, where the host and the client each maintain respective descriptor lists of bus controller commands. The client computer has a bus controller that changes its descriptor list. The host computer receives from the client computer update commands that, when executed, change the host's descriptor lists in substantially the same manner in which the bus controller changes the descriptor lists on the host computer.

37 Claims, 12 Drawing Sheets

Bridged USB Stack – Bridged List Transfer Method

U.S. PATENT DOCUMENTS

2006/0123166 A1 6/2006 Toebes et al.
2006/0233201 A1 10/2006 Wiesenthal
2007/0147522 A1* 6/2007 Seto et al. .................. 375/260

OTHER PUBLICATIONS

"Extending the Benefits of USB", Whitepaper 2004, Icron Technologies Corporation, 8 pages, Copyright 2004.

Cravaotta, ,Robert, Technical Editor, EDN, "Portable Connection: Can USB work over a network?", USBoIP Whitepaper, EDN, pp. 53-62, Nov. 10, 2005.

Hirofuchi, Takahiro, Kawai, Eiji, Fujikawa, Kazutoshi, and Sunahara, Hideki, "USB/IP—a Peripheral Bus Extension for Device Sharing over IP Network", 2005 USENIX Annual Technical Conference, FREENIX Track, Anaheim, CA, 28 pages, Apr. 2005.

"USB Over IP: Turning Your Network Into an I/O Bus", Digi Corporation Whitepaper 91001239 A1/0204; www.ionetworks.com, 3 pages, Copyright 2003-2004.

"OpenHCI Open Host Controller Interface Specification for USB," Release: 1.0a, 160 pages, Sep. 14, 1999.

USPTO Non-Final Office Action mailed Jun. 4, 2008 for U.S. Appl. No. 11/549,055, filed Oct. 12, 2006.

USPTO Non-Final Office Action mailed Mar. 24, 2009 for U.S. Appl. No. 11/278,378, filed Mar. 31, 2006.

* cited by examiner

FIG. 1 USB Stack Architecture
PRIOR ART

FIG. 2 Bridged USB Stack – Bridged Peripheral Bus Driver Method
PRIOR ART

FIG. 3 Bridged USB Stack – Bridged List Transfer Method

FIG. 4 List Management and Update Method

"Correct Shadow TD List"

FIG. 8 Transfer Management and Control Architecture

FIG. 9 ED and TD Descriptor Lists

FIG. 10 List Shadowing Pointers

Remote TD Update Processing using
Reliable Communications Model

Remote TD Update Processing using Unreliable Communications Model

METHODS AND APPARATUS FOR BRIDGING A BUS CONTROLLER

RELATED APPLICATIONS

The present application is a continuation in part of co-pending U.S. patent application Ser. No. 11/278,378, filed Mar. 31, 2006, and claims priority to U.S. Provisional Patent Application Ser. No. 60/726,419, filed Oct. 12, 2005, and 60/669,212, filed Apr. 6, 2005 incorporated by reference in it their entirety.

FIELD OF THE INVENTION

The invention relates generally to methods for connecting a peripheral device to a computer. More specifically, the invention provides a pair of bridging apparatus and methods for bridging a USB connection across a computer network that negates the need for peripheral bus drivers at the remote user interface where the peripheral device is connected.

BACKGROUND OF THE INVENTION

Historic advances in computer technology have made it economical for individual users to have their own computing system, which caused the proliferation of the Personal Computer (PC). Continued advances of this computer technology have made these personal computers very powerful but also complex and difficult to manage. For this and other reasons there is a desire in many workplace environments to separate the display and user interface devices including the keyboard, mouse and other peripheral devices from the storage and application processing parts of the computing system. In this configuration, the user interface devices are physically located at the desktop, while the processing and storage components of the computer are placed in a central location. The user interface devices are then connected to the processor and storage components with some method of communication.

There are two existing categories of methods for enabling the physical separation of USB peripheral devices from processing software. The first category includes methods using high level software bridging techniques and the second category includes methods using low level physical bridging.

FIG. 1 is a prior art illustration of a standard USB stack architecture as found in host system 150, an example of which is a standard PC environment without any separation between a computing system and its USB bus and devices. USB software drivers 120 are comprised of USB device driver 100, for example a USB mouse driver which sends high-level USB I/O commands to a set of peripheral bus drivers 102, comprised of core driver 104 and host controller (HC) driver 106. Core driver 104 converts the high level USB I/O commands into USB Request blocks 160 which are communicated to host controller driver (HCD) 106. HCD 106 interprets the USB request blocks and uses memory-based HC control structures 130 in host memory 108. These structures include a standardized set of descriptor lists and host controller communications area (HCCA) to control the operation of peripheral bus host controller 110, which in turn provides USB connection 112 to USB device 114. In a USB embodiment, peripheral bus host controller 110 may also be referred to as a USB host controller. Other embodiments such as an IEEE 1394 host controller controlling an IEEE 1394 peripheral bus are also possible.

FIG. 2 illustrates a prior art approach that illustrates a bridging architecture encompassing the high-level software bridging category of methods. In the example, host system 250 is connected to remote system 260 by some form of network. An example of such a networked system is a host computer server connected to a remote thin client. Referring to FIG. 2, USB device driver 270 sends I/O commands to host bridged peripheral bus drivers 200, comprising core driver 204 and virtual HCD 202. Note that USB device driver 270 and core driver 204 are the same as the equivalent components in FIG. 1. Host bridged peripheral bus drivers 200 communicates USB request blocks 222 over physical separation link 220 to remote bridged peripheral bus drivers 230 of a remote system. Physical separation link 220 may be a standard network connection such as an IP/Ethernet connection. Remote bridged peripheral bus drivers 230 include stub driver 206, core driver 208 and HCD 209 which uses memory-based HC control structures 234 in remote memory 232 to communicate with a remotely located peripheral bus host controller 210 (where remotely located peripheral bus host controller 210 has the same function as peripheral bus host controller 110 in FIG. 1). Depending on the remote address environment, memory-based HC control structures 234 in remote memory 232 may use the same or different addressing to non-bridged memory-based HC control structures 130 in host memory 108 shown in FIG. 1. Remote peripheral bus host controller 210 communicates with remote USB device 214 over standard USB bus 212 as before (where remote USB bus 212 and device 214 are identical to USB bus 112 and USB device 114 respectively). Products such as Microsoft's RDP, Anywhere USB and others bridge the USB signals at a software driver layer using software bridging methods similar to or the same as example FIG. 2. These methods require special virtualized peripheral bus drivers (i.e. host bridged peripheral bus drivers 200) compared to those of a standard PC using peripheral bus drivers 102. Furthermore, these methods typically mandate that the remote system (e.g. a thin client) maintain its own lightweight operating system to support remote bridged peripheral bus drivers 230. The need for specialized host system drivers and remote software results in increased complexity and maintenance requirements over a standard PC system which defeats many of the objectives related to remote user interface architectures. Furthermore, the need for matching host and remote drivers limits interoperability between USB devices and host systems, further limiting the appeal of software bridging solutions.

The second category of methods for separating USB devices includes transport layer extension techniques as provided by USB cable replacement products or KVM extension systems. These products use host and remote hardware modules for communicating equivalent USB bus signals over wired or wireless links. In the case of wired links, USB signals are typically communicated over dedicated CAT5 cabling between a host module connected to the USB port of a host computer and a remote module connected to a USB device. Icronís ExtremeUSB is an example of a CAT5 extension that enables a limited separation between a remote user interface and host system. The major drawback of transport layer solutions are the limitations imposed by additional cabling. The addition of non-standardized cabling to corporate LAN infrastructure adds to capital costs and increases the maintenance burden. Furthermore, unless elaborate and expensive optical or wireless transceivers are used, USB peripherals may only operate correctly over limited distance due to bus timing constraints (such as time critical acknowledgement protocols) which also limits full compliance with the USB protocol.

In summary, existing methods of bridging USB peripheral interfaces require significant complexity at the remote user interface, and have reduced interoperability or distance and performance limitations. System costs and maintenance overheads are increased which defeats the objective of centralized computing. Therefore, there is a heartfelt need for a better method for providing USB and other peripheral connections between a host processor and a remote user interface that meets the economic objectives of centralized computer processing without the limitations described above.

SUMMARY OF THE INVENTION

In one aspect, the present invention provides a method for coordinating descriptor lists updates between a host computer and a client computer, where the host and the client each maintain respective descriptor lists of bus controller commands. The client computer has a bus controller that changes its descriptor list. The host computer receives from the client computer update commands that, when executed, change the host's descriptor lists in substantially the same manner in which the bus controller changes the descriptor lists on the client computer. In an embodiment, host computer receives data with these update commands. This data is associated with a change to be made to a list on the host computer and is written into memory space described by a descriptor in a list on the host computer. In an embodiment, the host computer queues update commands and allocates a data buffer in memory for holding data until update commands to one of the host descriptor lists can be performed. The data buffer is then deallocated and freed when a transfer descriptor is removed from a descriptor list. The update commands may include commands that add a descriptor to a descriptor list, removes such a descriptor, or changes a descriptor in a list. Additionally, update commands can move a descriptor from one list to another, and may also include an identifier used by the host computer to track a sequence of executed update commands.

In an embodiment, the host computer may utilize descriptor lists with descriptors that have information fields used by the host computer to maintain substantial equivalence between descriptor lists on the host computer and descriptor lists on the client computer. The information fields may utilize pointers that map addresses of data buffers and host descriptors in one memory that are associated with the host computer's descriptor lists described above to addresses in another memory associated with descriptor lists having descriptors that include information fields. The information fields may include a descriptor sequence number used by the host computer to re-order descriptors in the latter descriptor lists. The information fields may also include a validity flag value that identifies a descriptor state based on the validity flag value. This validity flag value may also be used for identifying descriptors that are to be released from descriptor lists. These information fields can also include indicia that are used for determining a local update rate. In embodiments utilizing isochronous data, values in the information fields can be used in the smoothing of the isochronous data.

In an embodiment, the host computer executes the update commands in a manner equivalent to an independent bus controller as observed by applications and an operating system running on the host computer. In such embodiments, the host computer may maintain a bus controller state to enable the host computer to execute update commands in a manner equivalent to an independent bus controller. In an embodiment, the update commands include state information updates that are used to maintain the equivalence of an independent bus controller. In an embodiment, at least one of the descriptor lists on the host computer is a list containing endpoint descriptors and transfer descriptors. In an embodiment, at least one of the descriptor lists on the host computer is a done queue that stores descriptors already used.

The embodiments described above can be implemented in hardware or in software, depending on the embodiment.

In another aspect, the present invention provides a method for coordinating descriptor list updates between descriptor lists on a host computer and descriptor lists on a client computer by detecting changes occurring to the descriptor lists on the client computer and sending to the host computer update commands that, when executed, change the descriptor lists on the host computer to be substantially equivalent to the descriptor lists on the client computer. As described above, the update commands may include commands that add a descriptor a descriptor list, removes such a descriptor, or changes a descriptor in a list. Additionally, update commands can move a descriptor from one list to another, and may also include an identifier used by the host computer to track a sequence of executed update commands.

Also as described above, descriptor lists may have descriptors that have information fields used by the host computer to maintain substantial equivalence between descriptor lists on the host computer and descriptor lists on the client computer. The information fields may utilize pointers that map addresses of data buffers and host descriptors in one memory that are associated with the host computer's descriptor lists described above to addresses in another memory associated with descriptor lists having descriptors that include information fields. The information fields may include a descriptor sequence number used by the host computer to re-order descriptors in the latter descriptor lists. The information fields may also include a validity flag value that identifies a descriptor state based on the validity flag value. This validity flag value may also be used for identifying descriptors that are to be released from descriptor lists. These information fields can also include indicia that are used for determining a local update rate. In embodiments utilizing isochronous data, values in the information fields can be used in the smoothing of the isochronous data.

The embodiments described above can be implemented in hardware or in software, depending on the embodiment.

Many other features and advantages of the present invention will be realized from reading the following detailed description, when considered in conjunction with the drawings, in which:

DETAILED DESCRIPTION

The present invention describes apparatus and methods for separating USB peripheral devices from a host PC and the associated USB device drivers across a computer network such that the standard host USB software drivers operate without modification and no additional PC host software is required at the host system and no device specific software is required at the remote system.

As referred to herein, an endpoint descriptor (ED) is a system memory data structure that identifies a source or sink of data. Also as referred to herein, a transfer descriptor (TD) is a system memory data structure that is used by the Host Controller to define a buffer of data that will be moved to or from an endpoint. TDs come in two types: general and isochronous. The General TD is used for Interrupt, Control, and Bulk Endpoints and an Isochronous TD is used to deal with the unique requirements of isochronous transfers. Two TD types are supported because the nature of isochronous transfers does not lend itself to the standard DMA buffer format and the packetizing of the buffer required for isochronous transfers is too restrictive for general transfer types. While EDs and TDs are well-known in USB contexts, they also have equivalents in IEEE 1394 contexts, where a TD is referred to as a direct memory access (DMA) descriptor, and an ED is referred to as a DMA context.

Figure 3:
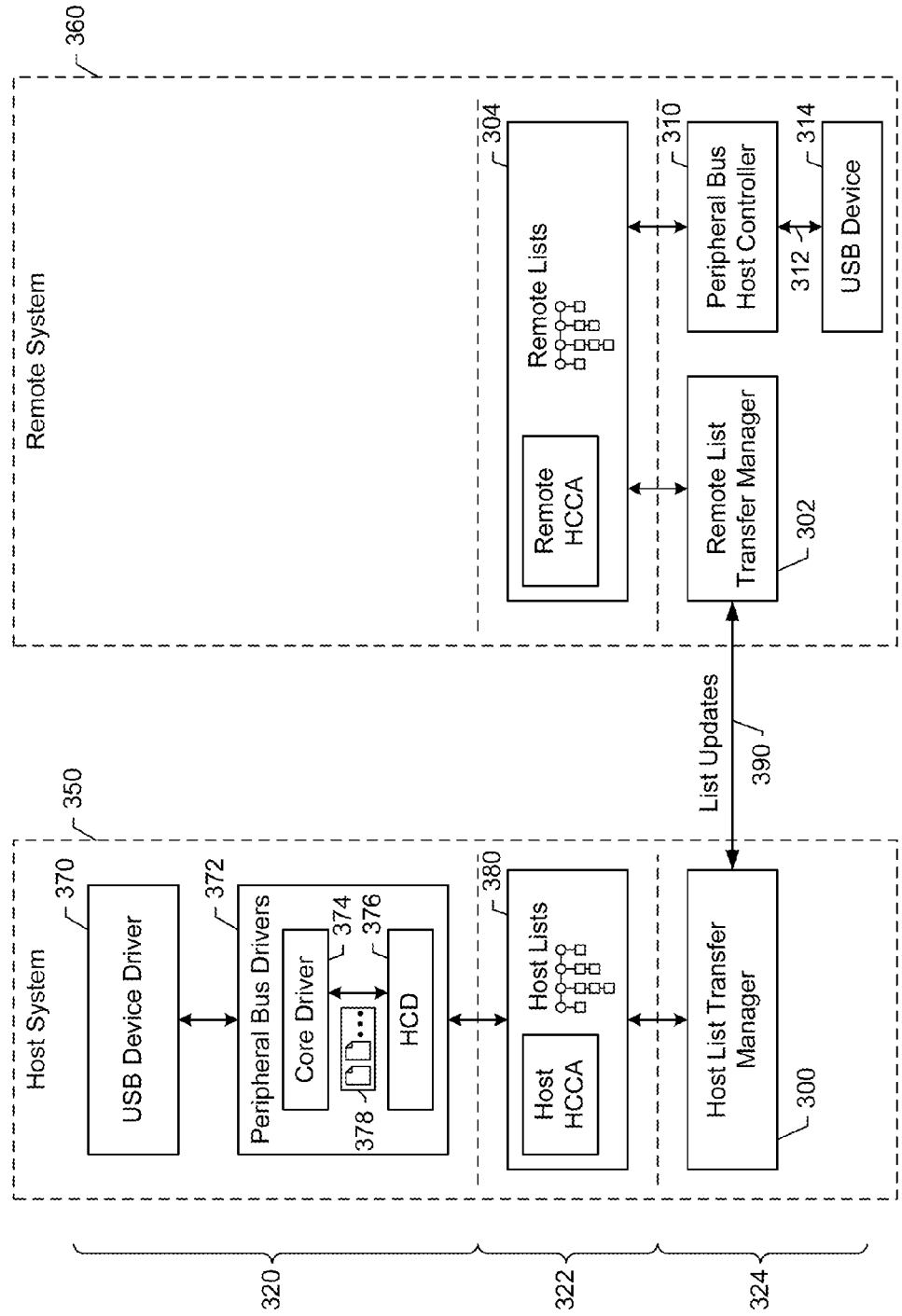
FIG. 3 shows a method of separating USB software drivers from a USB host controller across a network using a pair of list transfer managers that manage an equivalent set of lists at the remote system.

FIG. 3 shows a method for separating standard USB software drivers 320 from peripheral bus host controller 310 as used by the present invention. Note that peripheral bus host controller 310 is identical to peripheral bus host controller 110 in FIG. 1 with the exception that it is remotely located. As shown, host list transfer manager (HLTM) 300 of host system 350 and remote list transfer manager (RLTM) 302 of remote system 360 operate at the appropriate ends of the network to enable the separation of USB device driver 370 and peripheral bus drivers 372 from peripheral bus host controller 310 and USB device 314 (which is a remote equivalent of USB device 114 in FIG. 1). HLTM 300 and RLTM 302 monitor host memory 380 and remote memory 304 respectively and communicate list updates and associated data to the other end of the network across physical separation link 390, effectively maintaining a set of lists in remote memory 304 equivalent to those in host memory 380.

In one embodiment of the present invention, peripheral bus host controller 310 is an embedded USB host controller connected to remote memory 304 and RLTM 302 by embedded control and data buses. In an alternative embodiment, peripheral bus host controller 310 is a standard USB controller that connects to a system bus such as PCI or PCI-E of computer system. In this embodiment, the system bus and standard chipset components are used to connect peripheral bus host controller 310 with remote memory 304. In another alternative covered under the scope of the present invention, peripheral bus host controller 310 may be a non-standard controller. In this case, definitions for descriptor fields and registers may be non-standard variations on the standard definitions as specified by OHCI and other specifications.

Figure 1:
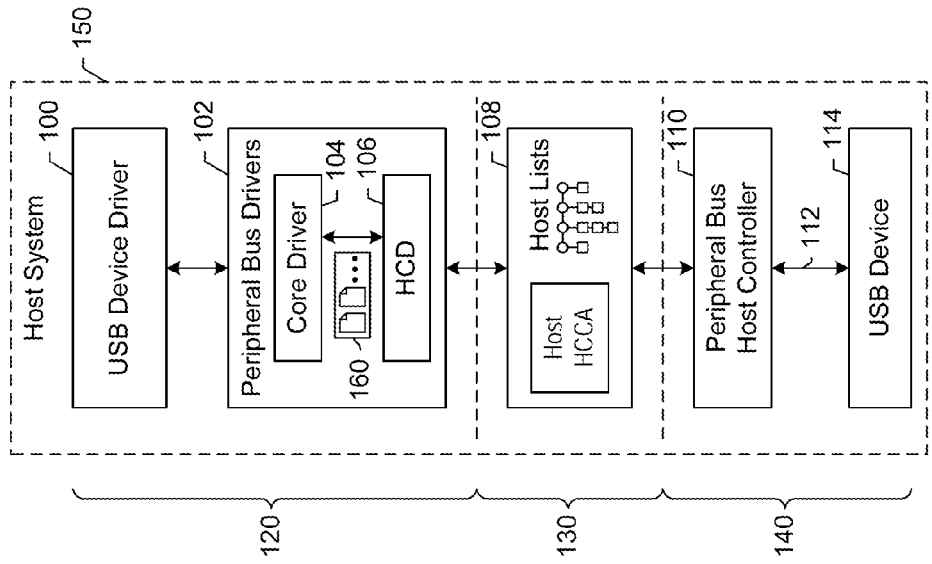
FIG. 1 is a prior art illustration of a USB stack architecture.

In the architecture illustrated in FIG. 3, USB software drivers 320 and memory-based host controller (HC) control structures 322 in host memory 380 are identical to those used in the standard architecture described in FIG. 1. No modifications to peripheral bus drivers 102 (in FIG. 1) are required and no peripheral bus drivers are necessary at remote system 360. RLTM 302 operates to present a standard HC interface to peripheral bus host controller 310.

Figure 2:
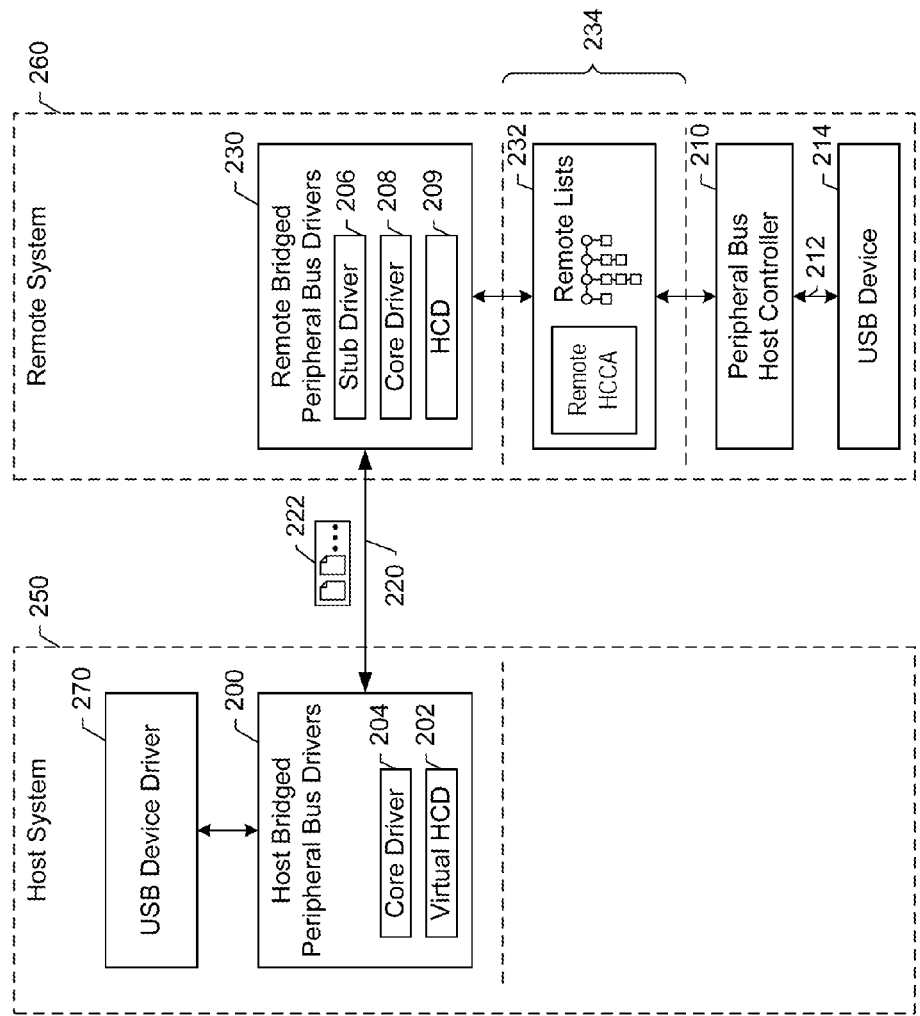
FIG. 2 is a prior art illustration showing an existing bridging method for separating USB software drivers from a USB host controller across a network.

Peripheral device host controller 310 and USB device 314 are located at remote system 360 similar to FIG. 2 although, unlike remote system 260, remote system 360 is a simplified environment without remote bridged peripheral bus drivers 230, thus indicating that no operating system supporting USB device drivers or general CPU is required at remote system 360 either. Note that in the embodiment described, peripheral device host controller 310 refers to a USB host controller but other embodiments including IEEE 1394, remote SCSI or storage system interfaces may also be implemented.

HLTM 300 tracks changes to host lists in host memory 380 and communicates them to the remote system. HLTM 300 detects changes to the host list by periodically scanning the list structure to look for changes. The scanning is performed in the same manner a USB host controller would traverse the list structure. HLTM 300 also receives changes to remote lists in remote memory 304 caused by peripheral bus host controller 310 and makes the corresponding changes to lists in host memory 380.

HLTM 300 communicates with host controller driver (HCD) 376 using standard USB HC methods and control structures including host memory-based host controller communications area (HCCA) and memory mapped operational registers (OPR). HCD initiated control information such as OPR and HCCA updates are also communicated to RLTM 302.

RLTM 302 receives changes to lists in host memory 380 and makes corresponding changes to lists in remote memory 304. RLTM 302 also tracks changes to lists in remote memory 304 and communicates them to HLTM 300, which in turn updates host memory 380. When peripheral bus host controller 310 removes a transfer descriptor (TD) from the head of a remote TD list, it is added to the head of a done queue. RLTM 302 periodically traverses the done queue and transmits the retired TDs back to HLTM 300 so that the shadow TD lists can be synchronized with the remote lists and the TDs retired to HCD 376 (note that HCD 376 is the same as HCD 106 in FIG. 1). RLTM 302 presents a standard host controller interface to peripheral bus host controller 310 by managing HC control structures, including descriptor lists and HCCA in remote memory 304 in addition to a control connection which provides an OPR register interface and enables other control functions via connection 406 shown in FIG. 4. Host controller-initiated control information such as OPR updates is communicated back to HLTM 300.

In an alternative embodiment, peripheral bus host controller 310 is not a standard controller but performs operations that emulate a compatible USB device interface 312. In this alternative embodiment, RLTM 302 generates lists suitable for the non-standard peripheral bus host controller.

In another alternative embodiment, HCD 376 is replaced with an equivalent host controller driver that communicates changes that it makes to host lists across the network to RLTM 302. In this embodiment, traversing of lists to detect changes is no longer required given the host controller driver has inherent knowledge of the modifications. In the embodiment, HLTM 300 becomes a software component of HCD 376 and RLTM remains unchanged.

Figure 4:
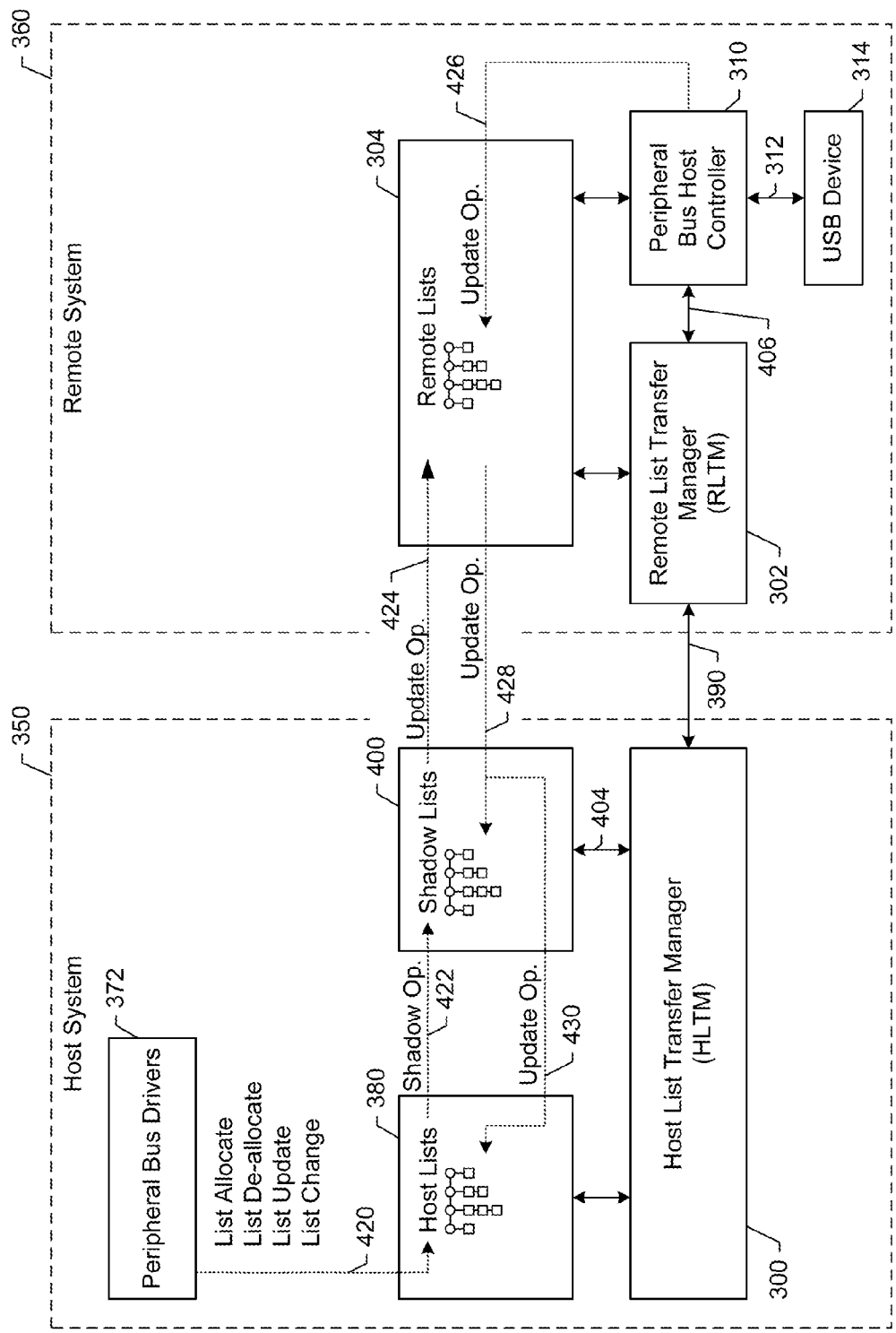
FIG. 4 shows a method used to maintain host and equivalent updated remote lists.

FIG. 4 shows a detailed view of the operations used by the present invention to maintain host lists in host system 350 and equivalent updated remote lists in remote system 360. Host lists in host memory 380 may be changed by peripheral bus drivers 372 and remote lists in remote memory 304 may be updated by peripheral bus host controller 310. In either case, the HLTM 300 and RLTM 302 synchronize changes with the corresponding lists at the other end of the network by transmitting list update packets, an update acknowledgement protocol and control information across network connection 390.

Peripheral bus drivers 372 maintain a set of host lists in host memory 380 in the usual way (i.e. as specified by OHCI, EHCI or UHCI specifications). In the embodiment described by FIG. 4, an additional set of shadow lists in HLTM memory 400 is introduced at host system 350 to enable tracking of list updates.

Figure 9:
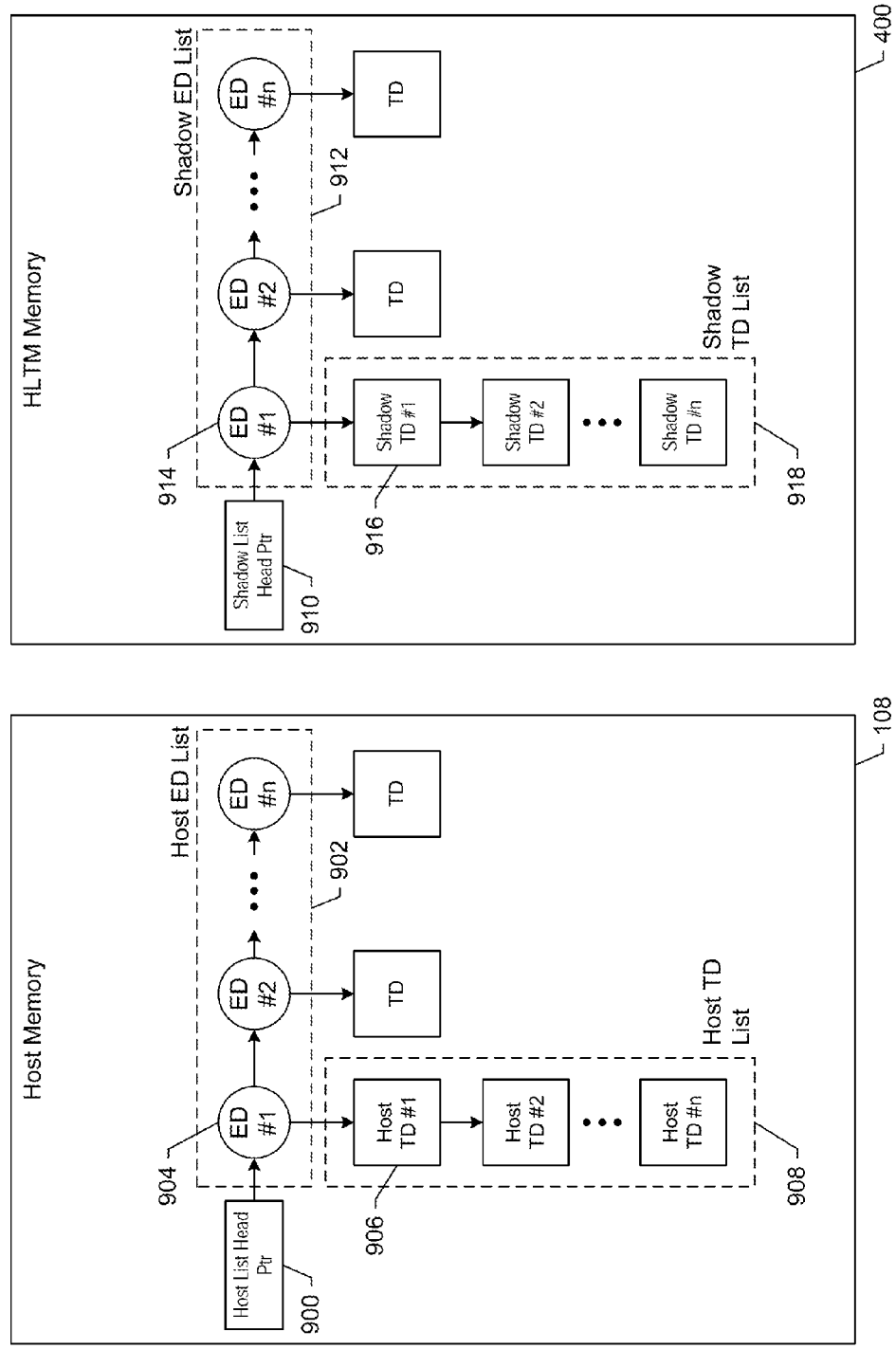
FIG. 9 shows corresponding endpoint and transfer descriptor lists in host and shadow memory.

FIG. 9 provides a general view of the descriptor list structures residing in host memory 380 and HLTM memory 400. In FIG. 9, host list head pointer 900 points to host endpoint (ED) list 902. Each ED optionally links to a host TD list. For example, ED list head entry 904 links to TD list head entry 906 of host TD list 908. HLTM memory 400 has equivalent list structures. For the equivalent shadow list shown, shadow list head pointer 910 links to shadow ED list 912 and shadow ED list head entry 914 links to shadow TD list 918.

In the embodiment described by FIG. 4, HLTM memory 400 is a local memory structure directly connected to HLTM 300 by high-speed memory bus 404 (i.e. shadow lists are maintained in memory separate from host memory 380). Other embodiments are also feasible. RLTM 302 maintains remote lists in remote memory 304. These are a set of equivalent host lists consumed directly by peripheral bus host controller 310 as specified by OHCI, EHCI or UHCI specifications. HLTM 300 and RLTM 302 provide the physical processing and transfer infrastructure to support the list management and update methods described by FIG. 4. Structural detail of these modules is provided in FIG. 8. Outbound USB data is transferred as data update packets from data buffers in host memory 380 to equivalent locally organized data buffers in remote memory 304 where it is available for peripheral bus host controller consumption whenever referenced by an active TD in a remote list. Inbound USB data is transferred to host memory buffers referenced by host TDs. Part of the list and associated data transfer operation includes updating address pointers to match the different list and data buffer addressing environments used by the host, HLTM 300 and RLTM 302.

Operation 420 as shown represents list management operations initiated by peripheral bus drivers 372; specifically HCD 376 in FIG. 3. Peripheral bus drivers 372 perform list allocation, de-allocation, update and change operations on ED and TD lists in the standard way specified by OHCI or other specifications mentioned. Operation 422 represents a host list shadowing method. In the embodiment described, HLTM 300 traverses ED and TD lists for HCD-initiated changes by comparing lists in host memory 380 to equivalent shadow lists in HLTM memory 400 and updating the shadow lists to reflect the changes on a periodic basis, for example a 1 mS interval. Other embodiments with a different update frequency are also possible.

Figure 5:
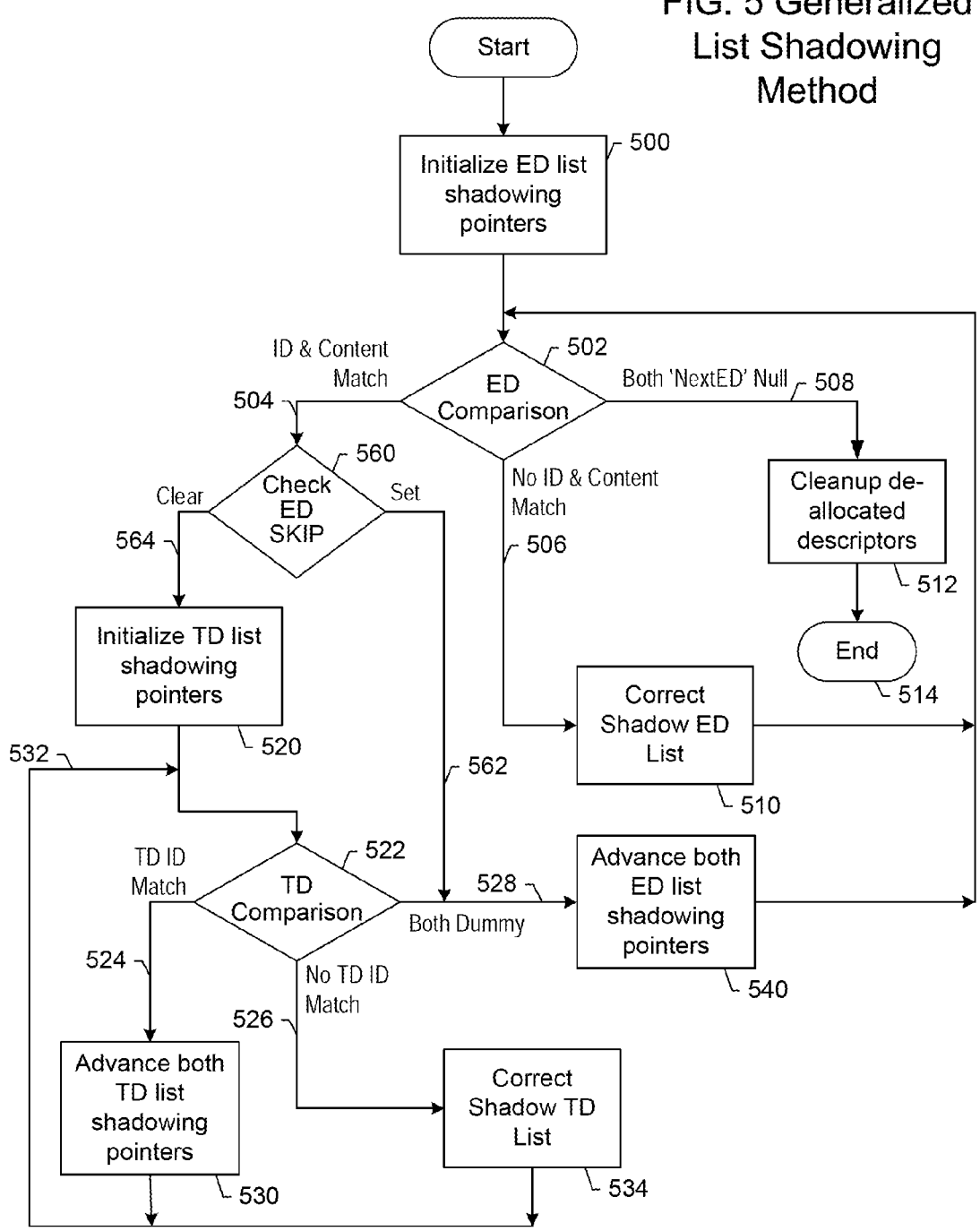
FIG. 5 shows a method for shadowing endpoint and transfer descriptor lists.
Figure 6:
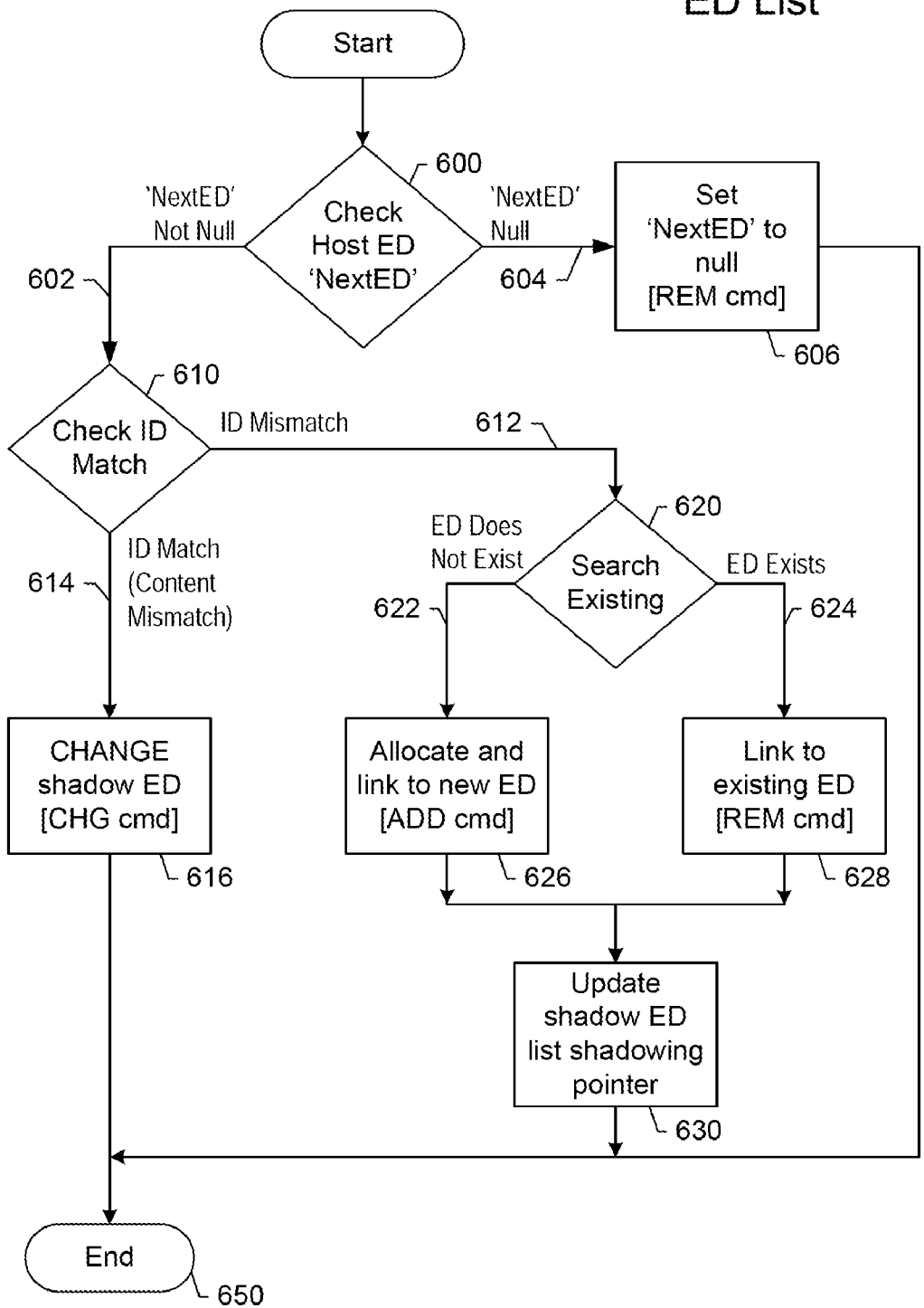
FIG. 6 shows a method for correcting a shadow endpoint descriptor list.
Figure 7:
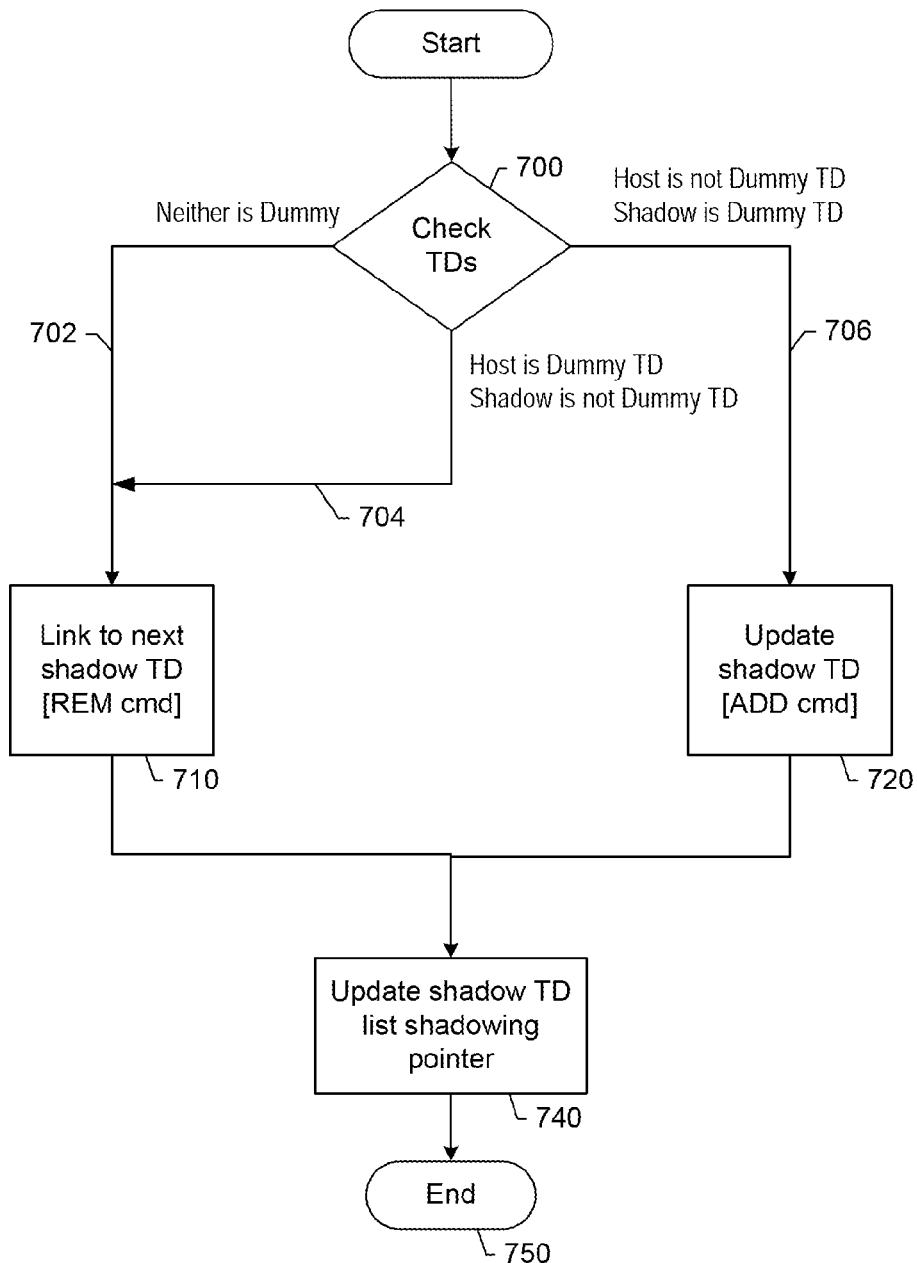
FIG. 7 shows a method for correcting a shadow transfer descriptor list.

The descriptor list shadowing method used in this embodiment is shown in FIG. 5. An embodiment of an ED shadow list correction method is shown in FIG. 6. An embodiment of an of TD shadow list correction method is shown in FIG. 7. Using this list shadowing method, HLTM 300 generates a set of list change commands for RLTM 302 to operate on an equivalent set of remote lists in remote memory 304 that are similar to the commands the HCD used to operate on the host lists in host memory 380. Operation 424 represents a remote list update method. Changes to host lists in host memory 380 identified during host list shadowing (operation 422) are transmitted to the equivalent remote lists using a set of list update commands described by Table 1.

In Table 1, a dummy TD is defined as the last TD in a TD list. The dummy TD has the same to-be-filled status as described for a dummy TD in the OHCI or equivalent standard. A dummy TD is identified as having the same location pointer as the TailP of the associated ED. A dummy TD is not required to have an associated data buffer.

TABLE 1

List Update Command Set and Methods

| Command | Method |
| --- | --- |
| ADD ED<br>Note that a ED may be added anywhere in a list | Upon receiving an ADD ED command, RLTM 302 adds the ED in a way similar to how HCD 376 adds an ED to a host list by performing the following steps:<br>a) Obtain a free ED and associated dummy TD<br>b) Update the contents of the free ED to match the contents of the corresponding host list ED which has been communicated.<br>c) Update the "NextED" field of the new ED to point to the next ED by copying the "NextED" field of the last ED ahead of the insertion point.<br>d) Update the "NextED" field of the last descriptor ahead of the insertion point in the ED list to point to the new ED<br>e) In the case where a new ED list head entry is being added, update the remote list head pointer 910 to point to the new ED list head entry 904 |
| ADD TD<br>The command associates a data buffer with the current dummy tail TD and adds a new dummy descriptor to the tail of a descriptor list. | Upon receiving an ADD TD command, the transfer manager adds the TD in a way similar to how the HCD 376 adds a TD to the host list by performing the following steps:<br>a) Allocate a memory buffer for the new data<br>b) Store data at the defined buffer location |

TABLE 1-continued

List Update Command Set and Methods

| Command | Method |
|---|---|
| | c) Update the data buffer pointer fields (e.g.CBP and BE in the case of a general TD) of the current dummy TD to point to the new data buffer<br>d) Obtain a free TD to be used as the next dummy TD<br>e) Update the "nextTD" field of the current dummy TD to point to the free TD<br>f) Update other fields in the current dummy TD<br>g) Update the tail pointer ('TailP') of the associated ED to include the newly-linked free TD. This free TD is now the dummy TD |
| REM ED<br>The command removes a descriptor from any point in a descriptor list | Upon receiving a REM ED command, the transfer manager removes the ED in a way similar to how HCD 376 removes an ED from the host list by performing the following steps:<br>a) Update the 'NextED' field of the last descriptor in the list ahead of the to-be-removed descriptor to point to the first descriptor in the remaining path after the to-be-removed descriptor<br>b) In the case where the ED list head entry 914 is being removed, the list head pointer ('HeadP') 910 is updated<br>Notes:<br>While it is possible to remove descriptors individually by copying the 'NextED' of the to-be-removed descriptor, it may be more efficient to redirect the remaining path of the ED list.<br>Acknowledgement requirements:<br>After an ED is removed from an ED list, HLTM 300 may not de-allocate or re-use the memory of the removed ED until RLTM 302 acknowledges that the ED has been removed and is no longer in use by peripheral bus host controller 310. |
| REM TD<br>The command removes a TD descriptor from any point in a TD list | Upon receiving a REM TD command, the transfer manager removes the TD in a way similar to how HCD 376 removes a TD from the host list by performing the following steps:<br>a) Update the 'NextTD' field of the last descriptor in the list ahead of the to-be-removed descriptor to point to the first descriptor in the remaining path after the to-be-removed descriptor |
| CHG ED/CHG TD<br>The command modifies any descriptor in a list. | Upon receiving a CHG command, the transfer manager performs the following step:<br>a) Update the appropriate field(s) of the indicated descriptor |

In the method described, shadow lists and remote lists are updated by HLTM 300 or RLTM 302 using one of the methods described in Table 1. Other embodiments using different commands and methods are also possible. For example, compound commands may be used to ADD or REM multiple descriptors but careful attention needs to be paid to the difference in status between host, shadow and remote lists in this case. In the embodiment described in Table 1, TDs are added to the tail of a TD list. Other embodiments where TDs are inserted in a list can also be implemented.

Basic list update commands shown in Table 1 are augmented with additional commands described in Table 2. There are instances where update commands must be performed synchronized with other events. Some commands require update acknowledgement using the protocol associated with selective commands shown in Table 2.

TABLE 2

Additional Commands and Update Acknowledgement Protocol

| Command | Acknowledgement Requirements |
|---|---|
| Skip ED | In normal operation (i.e. while an ED is active) the only change HCD 376 may make to a TD list is to add to its tail. Other changes mandate that the ED first be skipped.<br>HLTM 300 may not send any command other than a TD tail addition unless it is sure that RLTM 302 has received the prior ED skip command AND the ED is paused.<br>Thus, HLTM 300 and RLTM 302 must ensure remote ED changes are synchronized with the pausing of an ED initiated by a Skip ED command. One solution is to wait for an ED skip command acknowledgement before proceeding. |

TABLE 2-continued

Additional Commands and Update Acknowledgement Protocol

| Command | Acknowledgement Requirements |
| --- | --- |
| Disable ED List | While an ED list is disabled, HCD 376 may perform operations that temporarily break the integrity of the list. Thus, HLTM 300 and RLTM 302 must ensure ED list updates are synchronized with the disabling of an ED list. |

Operation 426 represents peripheral bus host controller 310 consuming descriptor lists as is known to those skilled in the art. Peripheral bus host controller 310 uses ED list, TD lists and done queues in the standard specified way, including removing TDs once completed and placing them on a remote done queue. Operation 428 represents HLTM memory 400 updates. RLTM 302 monitors peripheral bus host controller-initiated changes to remote lists and sends update commands to HLTM 300, which performs corresponding update operations to shadow lists in HLTM memory 400. HLTM 300 may not always be able to stream inbound data associated with a TD directly to host memory 380, for example in the case a list is disabled by HCD 376. Therefore, inbound data is buffered in HLTM memory 400 until data packets are authorized to be written to host memory 380. Consequently, a data buffer needs to be allocated in HLTM memory 400 when an inbound TD is assigned and de-allocated and freed when the associated TD is retired. In the embodiment, data buffers for outbound data are allocated and freed as TDs are assigned and retired so that RTLM 302 knows where to store the data.

Operation 430 represents updates to host lists in host memory 380. When shadow lists are updated, HLTM 300 also performs corresponding update operations to host lists, including TD retirement etc.

In the embodiment described, some additional features are also required to enable the list shadowing and update methods discussed. Update commands such as ADD, REM and CHG shown in Table 1 are sent as update command packets that include detailed change information and an identifier used to track the command sequence if explicit sequence tracking is required. Additionally, descriptors and registers are extended. In the embodiment, descriptors in HLTM memory 400 and remote memory 304 are extended to enable additional information fields necessary to enable the mirroring of lists across a network. Table 3 shows some of the key extensions used in the present embodiment.

TABLE 3

Extended Descriptor and Register Information

| Field Information | Description |
| --- | --- |
| Address Mapping Information | Pointers that map addresses of data buffers and host descriptors in host memory 380 to local addresses associated with HLTM memory 400 or remote memory 304 |
| Descriptor Sequence Identification | In an embodiment where a non-deterministic network protocol is used, a descriptor sequence number may be used to re-order descriptors or recover from lost descriptors |
| Validity Flags | In an embodiment where a non-deterministic network protocol is used, a validity flag enables allocation and de-allocation of valid descriptors |
| Extended Registers | Enable local timing control functions such as local update rate and smoothing of inbound and outbound isochronous data |

Figure 11:
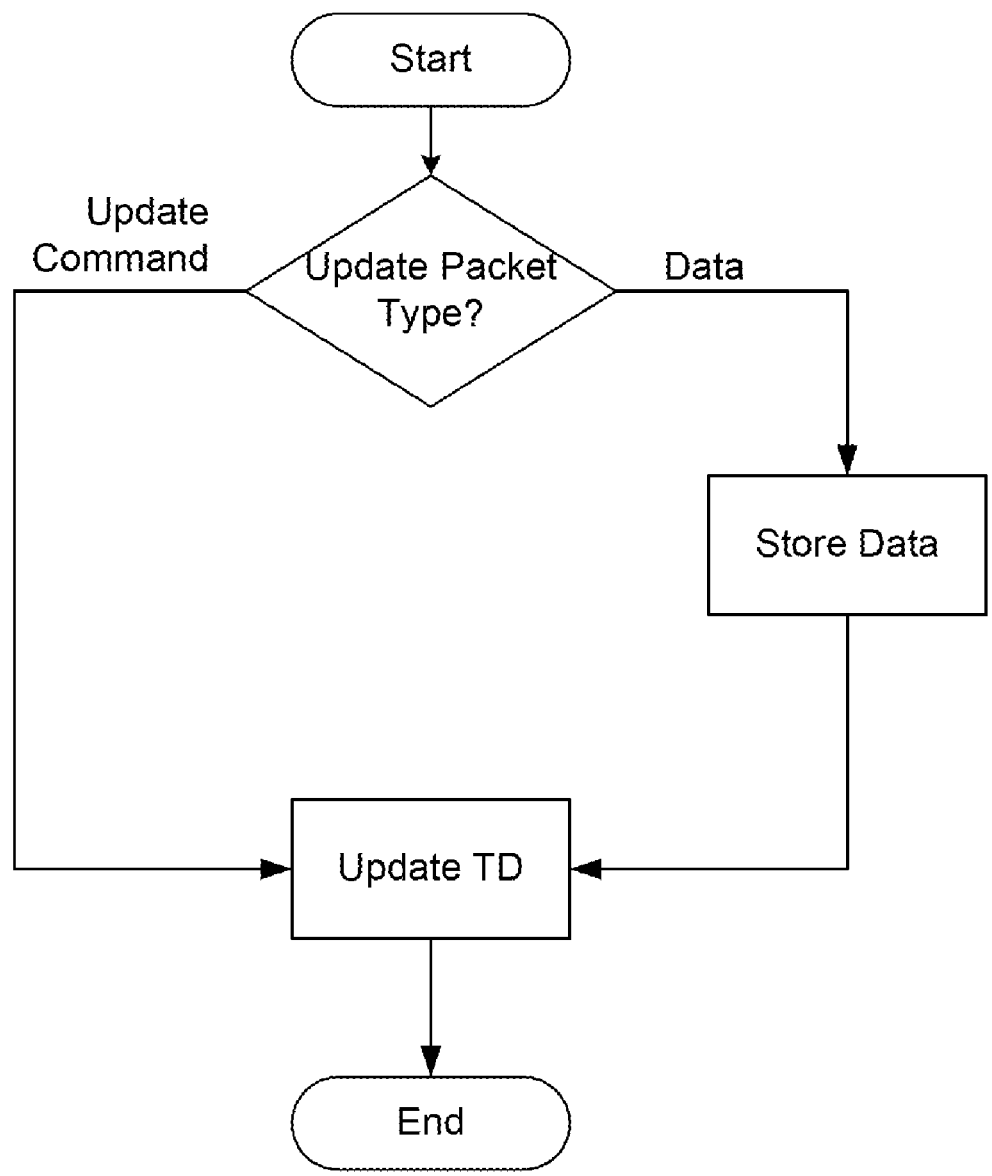
FIG. 11 shows a method for performing remote TD update processing using a reliable communications model.
Figure 12:
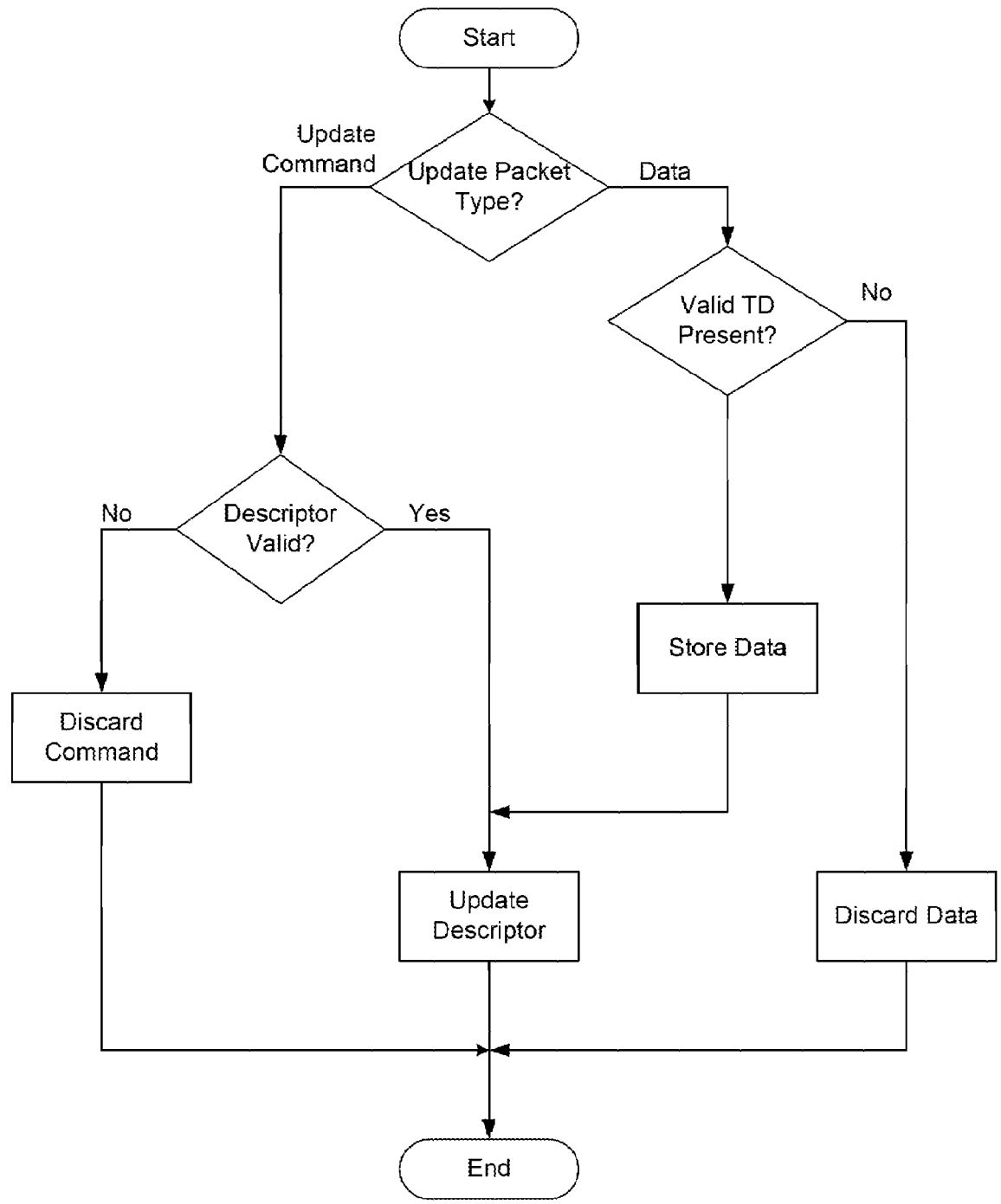
FIG. 12 shows a method for performing remote TD update processing using an unreliable communications model.

An embodiment of a data transmission method using a reliable communications protocol such as TCP/IP is described in FIG. 11. The communications of command update packets using an unreliable communications protocol such as UDP/IP requires validation checks that ensure inbound data is associated with a valid TD. An embodiment is shown in FIG. 12.

Figure 10:
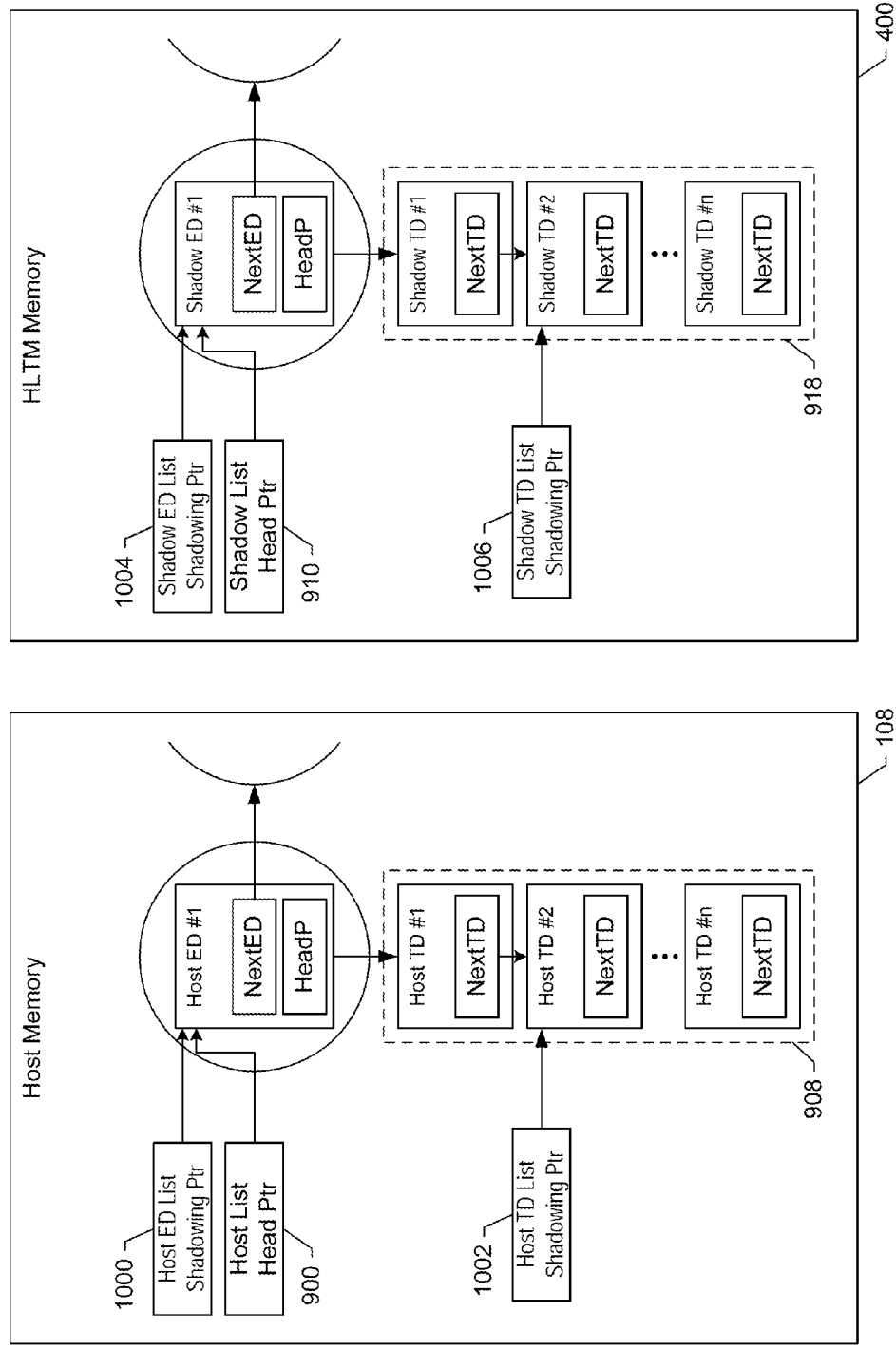
FIG. 10 shows a set of list shadowing pointers to endpoint and transfer descriptor lists in host and shadow memory.

FIG. 5 shows a method for shadowing ED and TD lists. The flowchart is augmented by FIG. 9 which provides a general view of the descriptor list structures residing in host and shadow memories and also augmented by FIG. 10 which shows host and shadow list shadowing pointers used by the described embodiment of the present invention. In FIG. 10, host ED list shadowing pointer 1000 is used by the shadowing method described to track a current position in host ED list 902 while host TD list shadowing pointer 1002 tracks a current position in host TD list 908. Shadow ED list shadowing pointer 1004 and shadow TD list shadowing pointer 1006 perform similar current position tracking of shadow lists in shadow memory 400.

The embodiment defined by FIG. 5 has two primary operations to list shadowing. In a first operation, both shadow ED list 912 and host ED list 902 are traversed from the ED list head entries. Each ED of shadow ED list 912 is compared with its corresponding ED in host ED list 902 and updated to reflect any changes made to host ED list 902 since the last comparison. In a second operation, shadow TD list 918 and host TD list 908 are traversed from the TD list head entries each time the first operation detects matching EDs. Each TD of shadow TD list 918 is compared with its corresponding TD in host TD list 908 and updated to reflect any changes made to host TD list 908 since the last comparison. For example, if ED 914 matches ED 904, TD list 918 is compared with TD list 908.

Referring to FIG. 5, ED shadowing pointers are initialized to point to the list head entries as a first step 500. In this step, host ED list shadowing pointer 1000 is initialized with the value from host list head pointer 900 (obtained from the HCCA for an Interrupt ED or operational registers for bulk and control EDs). Shadow ED list shadowing pointer 1004 is also initialized with the value of shadow list head pointer 910.

As a next step 502, the identities (IDs) and contents of corresponding host and shadow EDs are compared. In the embodiment described, IDs are based on a unique combination of FA, EN, D, ED fields and host memory address as these are fields that will not be modified by the host.

In case 504, the ID and contents of the shadow ED matches the ID and contents of the host ED. Note that this match excludes the case where the NextED field of both EDs is null which signals the end of both lists and is described as step 508. In case 504, the SKIP bit of the host ED is checked as next step 560. In case 562 the host ED skip bit is set. The current ED is passed over by advancing both host and shadow ED list shadowing pointers as performed by step 540. In case 564, the host ED skip bit is clear and TD shadowing commences as step 520 described in further detail below.

In case 506, the ID and contents of the shadow ED does not match that of the host ED and the shadow ED list is corrected as step 510 (detailed in FIG. 6). In this case, ED comparison step 502 is repeated with the updated shadow ED. In case 508, the NextED field of both host and shadow EDs is null, which signals that ED list comparison is complete. As a cleanup step 512, memory previously allocated to recently de-allocated descriptors is freed for other use and the shadowing process ends at step 514.

TD shadowing commences with step 520 where TD shadowing pointers are initialized to point to the TD list head entries. In step 520, host TD list shadowing pointer 1002 is initialized with the HeadP head pointer value of the referencing host ED which points to host TD list head entry 906. Shadow TD list shadowing pointer 1006 is also initialized with the head pointer (HeadP) value of the referencing shadow ED which points to shadow TD list head entry 916.

As a next step in TD shadowing 522, corresponding IDs of host and shadow TDs are compared. In the embodiment described, the ID for a general TD is based on DI, DP, R, NEXTTD, BE fields and address. The ID for isochronous TDs is based on FC, DI, SF, BP0, NEXTTD, BE fields and host address.

In case 524, the ID of the shadow TD matches the host TD in which case both TD list shadowing pointers are advanced to the next TD on the list at step 530 and TD comparison step 522 are repeated with the next TD on each list. Note that case 524 excludes the case where both host and shadow TDs are dummy TDs which signals the end of both lists and is described by step 528. In case 526, the TDs do not match and the shadow TD is corrected at step 534 (detailed in FIG. 7). TD comparison step 522 is then repeated using an updated shadow TD. In case 528 host and shadow TDs are both dummy TDs which signals that the TD comparison is complete.

Host and shadow ED list shadowing pointers are advanced to the next EDs as step 540 and ED comparison step 502 are repeated for the next ED on each list. In the embodiment, list shadowing is executed under the same operational conditions as when the HC processes the list to ensure that changes initiated by the HCD at any time are identified and coherency is maintained. For example, lists are only shadowed during the standard USB operational state (per OHCI equivalent). Lists are not shadowed while disabled by the HCD.

FIG. 6 is a more detailed flowchart of step 510 (shown in FIG. 5) that corrects a shadow ED list. As a first step 600, the NextED field of the host ED is checked. In case 602, the NextED field of the host ED is not null so the ED is checked for an ID mismatch as a next step 610. Note that EDs will always be mismatched at this point. In case 612, host and shadow EDs have different IDs so the shadow ED list is searched as step 620 to establish if an ED matching the host ED is elsewhere in list. In case 622, the ED does not exist elsewhere in HLTM memory 400 (FIG. 4) so a new matching shadow ED is initialized and linked using an ADD command as defined in Table 1.

In case 624, the ED exists in HLTM memory 400 (FIG. 4) so a link to the existing ED is established as next step 628 using a REM command as defined in Table 1. As a next step 630, shadow ED list shadowing pointer 1004 is updated to point to the recently linked shadow ED and Correct Shadow ED List method is completed at step 650. In case 614, the IDs are the same which implies a content mismatch in which the shadow ED has a field discrepancy with the host ED as may occur if a host ED has been updated by HCD 376 (FIG. 3). In this case, the field of the shadow ED is updated using the CHG command described in Table 1 and Correct Shadow ED List method is completed at step 650. In case 604, the NextED field of the host ED is null so as step 606 the NextED field of the shadow ED in shadow ED list 912 is also set to null using the REM command to remove the next descriptor. At this point, step 510 of FIG. 5 Correct Shadow ED Listí method is completed at step 650.

FIG. 7 is a more detailed flowchart of step 534 (shown in FIG. 5) that corrects a shadow TD list 918. As a first step 700, the host TD is checked to determine if the end of the host TD list has been reached. If the TailP of the associated ED has the same pointer value as the TD shadowing pointer, then the dummy TD has been reached. In case 702, neither host TD nor shadow TD is a dummy TD so at step 710 the shadow list is updated by linking to the next TD in the shadow list using a REM command. Note also that in the embodiment described, a link established to the next TD in the list does not necessarily imply that next TD matches the TD of host TD list 908. In the case that TDs are still not matched, steps 522 TD comparison and 534 Correct Shadow TD list of FIG. 5 are repeated until a match is established. Other embodiments where multiple TDs are removed as one step can also be implemented.

In case 704, the host TD is a dummy TD (indicating the end of the host list) but the shadow TD is not a dummy so step 710 also proceeds where the shadow list TD is removed by linking to the next TD in the list using a REM command. In case 706, the host TD is not a dummy TD but the shadow TD is a dummy TD so step 720 is used to update the current dummy shadow TD (by filling in its fields) and linking it to a new dummy TD using an ADD command. Step 740 follows steps 710 or 720 in which shadow TD list shadowing pointer 1006 is updated to point to the updated shadow TD before step 534 of FIG. 5 ends at step 750.

Figure 8:
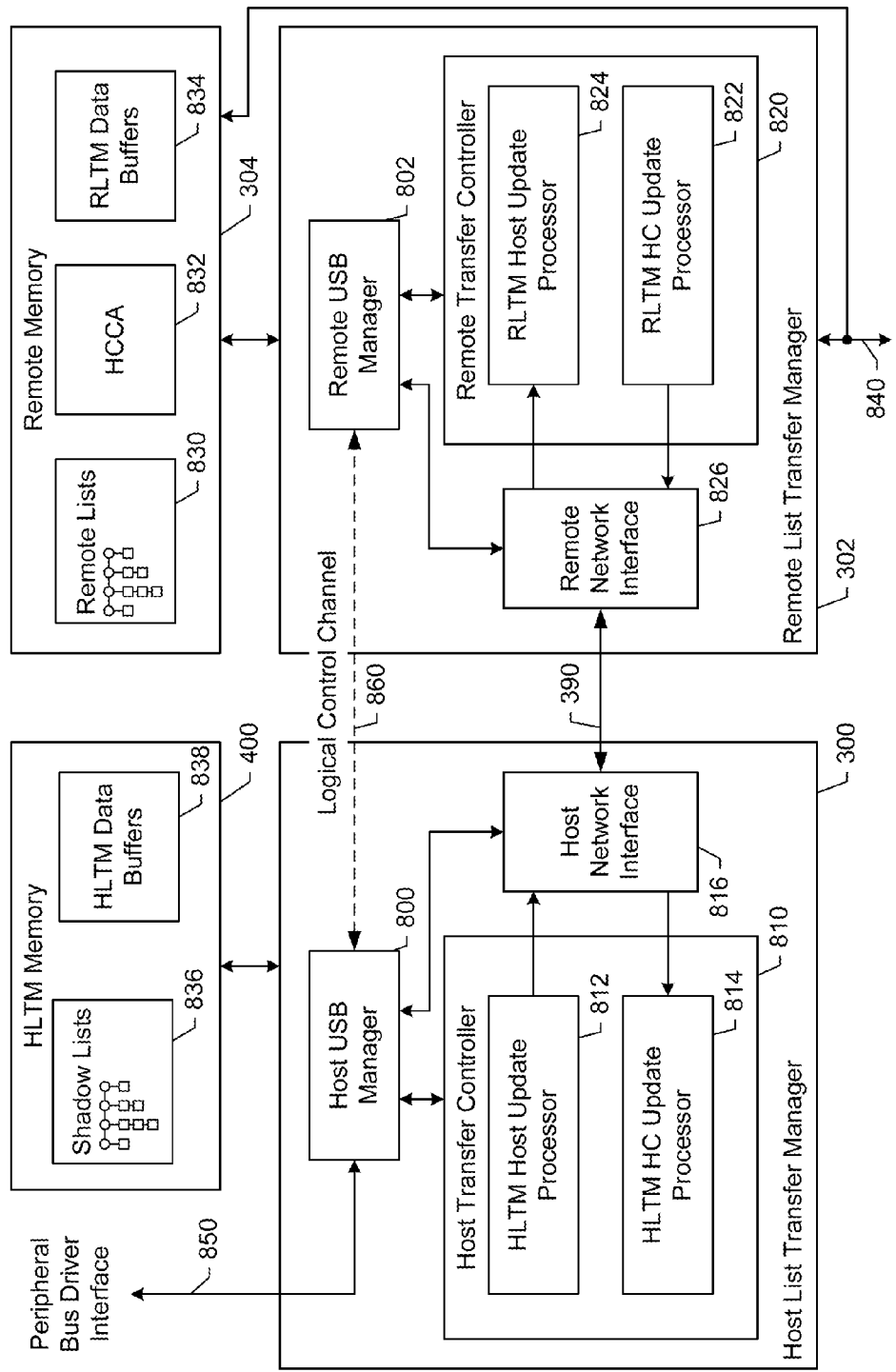
FIG. 8 shows an architecture embodiment for a pair of list transfer managers.

FIG. 8 shows an embodiment of an architecture for HLTM 300 and RLTM 302. HLTM 300 and RLTM 302 provide an inter-working function that bridges interface 850 (to HCD 376 in FIG. 3) with interface 840 to peripheral bus host controller 310. The bridge is formed across network connection 390 by bridging standard communications structures (HCCA, descriptor lists and OPR) and reflecting changes initiated by either HCD 376 or peripheral bus host controller 310 at the other end of the network. In the embodiment described, HLTM 300 and RLTM 302 are hardware modules, each comprised of a USB manager, a transfer controller and a network interface. Each module is attached to local memory which stores ED and TD data structures, data buffers, and other data that enables sequenced allocation, processing and retirement of descriptors described below. HLTM 300 includes host network interface 816 and RLTM 302 includes remote network interface 826 to enable packetization and transmission of outbound update packets as well as receiver functions for the de-packetization and processing of inbound update packets. Other control information including local state information is also communicated between the two modules.

Host USB manager 800 initializes HLTM 300 and negotiates the supported features with peer remote USB manager 802 using logical control channel 860 during the session establishment. In one embodiment, control channel 860 is a secure sub-channel operating over network connection 390. Host USB manager 800 manages state information, services interrupts and includes a set of peripheral host controller emulation functions. Host USB manager 800 also provides an OPR interface that manages updates of OPR registers (described in the OHCI specification) and handles OPR-related events. In the embodiment described, additional registers are provided to support implementation-specific functions described in Table 3. These extended registers are accessed by host USB manager 800 and host transfer controller 810. Host controller emulation functions include interrupt processing, frame counter generation, an early response mechanism for HCD commands that require an early response (i.e. providing responses earlier than can be delivered by RLTM 302 as is the case with bus state registers such as port power control registers) and methods for resolving potentially conflicting state changes simultaneously initiated by HCD 376 and peripheral bus host controller 310.

Host transfer controller 810 is comprised of HLTM host update processor 812 that generates updates for RLTM 302 and HLTM HC update processor 814 which processes update commands from RLTM 302. HLTM host update processor 812 performs list shadowing, memory management, list retirement and optionally provides timing control support for outbound isochronous data in applications with high network latency.

HLTM host update processor 812 performs shadowing methods described in FIG. 5. Update commands are generated by the shadowing function, assembled into a sequence of update command packets and transmitted to RLTM 302. TD-related data and register information is also assembled and transmitted, optionally using multiple packets if required. Different descriptor types such as EDs or TDs and different data types such as Bulk, Control, Interrupt or Isochronous types may be sent over the network using different transfer queues.

ED List shadowing illustrated in FIG. 5 may be optimized by enabling temporary data structures for the searching and tracking of lists. In the described embodiment, ED list searching (operation 620 in FIG. 6) is optimized though the generation of shadow search lists. Of specific value is a linear interrupt ED search list which is generated while traversing the tree structure of the interrupt ED list. Duplicate EDs (which may exist in the interrupt ED list) are excluded from the search list, enabling rapid tree traversal and an easy method for tracking EDs suitable for de-allocation. Other search lists may also be used for searching and tracking other ED and TD lists.

HLTM host update processor 812 also allocates and de-allocates shadow ED descriptors, shadow TD descriptors and HLTM data buffers 838 to store TD-related data. When a descriptor is added to a shadow list 836, HLTM 300 retrieves a free descriptor from a pool of free descriptors. When a descriptor is removed from one of the shadow lists, HLTM 300 deposits the removed descriptor back in the pool. In the embodiment described, the pool is comprised of a list of free descriptors. Data buffers are managed in a similar way. A free data buffer list contains free data buffers that HLTM 302 allocates and de-allocate as necessary. Note that due to synchronization delays caused by network delays, removed descriptors and data buffers may be attached to temporary delay lists before they are put back into the free pools.

HLTM host update processor 812 may also be used to reduce network latency associated with the playout of isochronous data by providing pre-acknowledgement of retired TDs to HCD 376. In one embodiment, TDs are retired at the expected frame rate determined by a frame counter provided by host USB manager 800 rather than waiting for retired TDs to be returned from RLTM 302. In the embodiment, HLTM host update processor 812 assumes no errors in transmitted TDs and ignores retirement information coming back from RLTM 302. In an alternative embodiment, the retirement information is used to manage the rate at which descriptors are retired at the host. In an embodiment that uses a non-deterministic network with an unreliable transport capability, isochronous USB with its support for unreliable transport is used to recover from traffic lost during network communications. In applications where network latency is small compared with data buffering latency, early retirement of TDs may not be required.

HLTM HC update processor 814 receives command update packets sent by RLTM 302, disassembles them into individual commands and executes them. Returned or retired TDs may have associated inbound data which RLTM 302 sends in data update packets. HLTM HC update processor 814 receives those packets and stores the data in host memory 380. Periodic updates of the remote OPR are also received and used to update the OPR in HLTM 300.

TD retirement commands sent by RLTM 302 are processed by retiring the TDs from host and shadow TD lists. Given that a descriptor list may be paused or that an ED may be disabled when data is returned from remote list transfer manger 302, HLTM HC update processor 814 temporarily stores the data in data buffers 838. If the associated end point or descriptor is removed the data buffer will be released without saving the data to the host memory 380. TDs for incomplete buffers are marked for delay until data buffers are completed and host memory is accessible for update; following which the TDs are retired in strict order.

In the embodiment, the number of fields of a TD are extended and includes fields with pointers to associated temporary data buffer locations (HLTM data buffers 838) in HLTM memory 400. In the embodiment described, an ED is not de-allocated from shadow list 836 until peripheral bus host controller 310 no longer references it and RLTM 302 has removed it from equivalent remote list 830.

In an embodiment of the present invention, HLTM host update processor 814 is used to reduce network latency associated with the inbound isochronous data by providing early retirement of TDs at the expected frame rate for the inbound isochronous data. In the embodiment, an independent list of imitation TDs are retired at the inbound data rate, reducing the latency of inbound isochronous data. Note that the initial data stream is garbage until the network latency is overcome. Data buffers may be primed with suitable data to limit effects of initial erroneous data. Alternatively, descriptors may be marked as having USB transmission errors until valid data is returned.

Remote USB manager 802 initializes RLTM 302 and negotiates the supported features with peer HLTM 300 during the session establishment. Remote memory 304 includes TD lists, ED lists and a done queue (remote lists 830 shown), RLTM data buffers 834, HCCA 832 as described by the OHCI specification and other data related to processing functions. The remote list also includes the extended fields necessary to manage the list mirroring with the host list.

Remote transfer controller 820 is comprised of RLTM host update processor 824 and RLTM HC update processor 822. RLTM host update processor 824 receives update command packets sent by HLTM 300, disassembles them into individual update commands and performs the indicated remote list updates. Added TDs may have associated outbound data that HLTM sends in update data packets. RLTM host update processor 824 receives the packets and stores the data in RLTM data buffers 834 of remote memory 304. The pointers used by the remote lists are updated to reflect the addresses of the remote lists and buffers as occurs with the host descriptor lists. In this embodiment, copies of the host list address pointers are maintained in the extended fields.

Each time an update packet is received for a TD, RLTM host update processor 824 updates the TD so as to indicate the progress or fill level of the TDs data buffer. Note that some descriptor list updates require the list to be in a defined state. For example a descriptor may need to be in a paused state before an update is possible. These operations may require independent acknowledgment before continuing with other operations to ensure descriptor integrity.

RLTM host update processor 824 also receives operational register updates and updates the OPR in RLTM 302 as appropriate. Note that the current host controller state (Operational, Suspend, Reset or Resume) as defined by the OHCI specification is set via the operational registers. It is the responsibility of HCD 376 to ensure that the minimum residency requirements in each state are respected (e.g. after setting the state to Reset, HCD 376 may not change the state for at least 50 ms). However, because of variable network latency, even though OPR updates are generated at the host with the correct time spacing, they may not arrive at RLTM host update processor 824 with the same time separation. Therefore RLTM host update processor 824 may need to delay application of the state change.

RLTM HC update processor 822 monitors modifications to the descriptor lists initiated by peripheral bus host controller 310 (in FIG. 3), assembles a sequence of commands and transmits them to the HLTM 300. Typically, peripheral bus host controller 310 removes TDs from the head of remote TD lists or makes modifications to certain fields within the associated EDs. When a TD is removed, it is added to the head of a done queue. Once each update cycle (1 ms in the described embodiment), RLTM HC update processor 822 traverses the done queue and transmits the retired TDs and associated inbound data back to HLTM 300 so that the shadow TD lists in HLTM memory 400 can be synchronized with the equivalent remote lists and the TDs retired to HCD 376. RLTM HC update processor 822 also queues and transmits TD-related data packets, ED modifications, OPR contents and extended register values to HLTM 300.

Peripheral bus host controller interface 840 provides a standard external or embedded host controller interface. An example of an external bus interface is a PCI-E interface while an AMBA bus interface is one example of an embedded interface to peripheral bus host controller 310. Other interconnects can also be implemented.

While methods and apparatus for bridging a USB connection have been described and illustrated in detail, it is to be understood that many changes and modifications can be made to embodiments of the present invention without departing from the spirit thereof.

What is claimed is:

1. In a host computer, the host computer in communication with a client computer; the host computer having a first plurality of descriptor lists of bus controller transfer commands, the client computer having a second plurality of descriptor lists and a bus controller that changes the second plurality of descriptor lists, a method for coordinating descriptor list updates, the method comprising:
   receiving from the client computer update commands that, when executed, change the descriptor lists in the first plurality of descriptor lists in the same manner in which the bus controller changes the descriptor lists in the second plurality of descriptor lists; and
   executing the update commands.

2. The method of claim 1, further comprising:
   receiving data with the update commands, the data associated with a change to be made to a list in the first plurality of descriptor lists; and
   writing the data into memory space described by a descriptor in a list in the first plurality of descriptor lists.

3. The method of claim 2, further comprising queuing update commands and allocating a data buffer in a memory for holding data until update commands to a list in the first plurality of descriptor lists can be performed.

4. The method of claim 3 further comprising deallocating and freeing the data buffer in a memory when a transfer descriptor is removed from a descriptor list in the first plurality of descriptor lists.

5. The method of claim 1, wherein the update commands comprise a command that adds a descriptor to one of the descriptor lists in the first plurality of descriptor lists.

6. The method of claim 1, wherein the update commands comprise a command that removes a descriptor from one of the descriptor lists in the first plurality of descriptor lists.

7. The method of claim 1, wherein the update commands comprise a command that changes a descriptor in one of the descriptor lists in the first plurality of descriptor lists.

8. The method of claim 1, wherein the received update commands comprise a command that changes and moves a descriptor from a first descriptor list in the first plurality to a second descriptor list in the first plurality of descriptor lists.

9. The method of claim 1, wherein the update commands comprise an identifier, the identifier used by the host computer to track a sequence of executed update commands.

10. The method of claim 1, wherein the host computer comprises a third plurality of descriptor lists, wherein descriptors in the third plurality of descriptor lists comprise information fields used by the host computer to maintain equivalence between the first plurality of descriptor lists and second plurality of descriptor lists.

11. The method of claim 10, wherein the information fields comprise pointers that map addresses of data buffers and host descriptors in a first memory associated with the first plurality of descriptor lists to addresses in a second memory associated with the third plurality of descriptor lists.

12. The method of claim 10, wherein the information fields comprise a descriptor sequence number used by the host computer to re-order descriptors in the third plurality of descriptor lists.

13. The method of claim 10, wherein information fields comprise a validity flag value, further comprising identifying a descriptor state based on the validity flag value.

14. The method of claim 10, wherein information fields comprise a validity flag value, further comprising releasing a descriptor based on the validity flag value.

15. The method of claim 10, further comprising determining a local update rate based on values contained in the information fields.

16. The method of claim 10, further comprising smoothing isochronous data based on values contained in the information fields.

17. The method of claim 1, wherein the host computer executes the update commands in a manner equivalent to an independent bus controller as observed by applications and an operating system running on the host computer.

18. The method of claim 1, wherein the host computer maintains a bus controller state to enable the host computer to execute update commands in a manner equivalent to an independent bus controller.

19. The method of claim 18, wherein the update commands include state information updates that maintains the equivalence of an independent bus controller.

20. The method of claim 1, wherein at least one of the descriptor lists in the first plurality of descriptor lists is a list containing endpoint descriptors and transfer descriptors.

21. The method of claim 1, wherein at least one of the descriptor lists in the first plurality of descriptor lists is a done queue.

22. In a client computer, the client computer in communication with a host computer, the host computer having a first plurality of descriptor lists of bus controller transfer commands, the client computer having a controller and a second plurality of descriptor lists of bus controller transfer commands, a method for coordinating descriptor list updates between the host computer and the client computer, the method comprising:
   detecting changes occurring to the descriptor lists in the second plurality of descriptor lists; and sending to the host computer update commands that, when executed, change the descriptor lists in the first plurality of descriptor lists to be equivalent to the descriptor lists in the second plurality of descriptor lists.

23. The method of claim 22, wherein the update commands comprise a command that adds a descriptor to the descriptor list in the first plurality of descriptor lists.

24. The method of claim 22, wherein the update commands comprise a command that removes a descriptor from the descriptor list in the first plurality of descriptor lists.

25. The method of claim 22, wherein the update commands comprise a command that changes a descriptor in the first plurality of descriptor lists.

26. The method of claim 22, wherein the update commands comprise an identifier, the identifier used by the host computer to track a sequence of executed update commands.

27. The method of claim 22, wherein descriptors in the descriptor lists of the second plurality of descriptor lists comprise information fields used by the host computer to maintain equivalence between descriptor lists in the first plurality of descriptor lists and the descriptor lists in the second plurality of descriptor lists.

28. The method of claim 27, wherein the information fields comprise pointers that map addresses of data buffers and host descriptors in a first memory associated with the descriptor lists in the first plurality to addresses in a second memory associated with the descriptor lists in the second plurality of descriptor lists.

29. The method of claim 27, wherein the information fields comprise a descriptor sequence number used by the host computer to re-order descriptors in the second plurality of descriptor lists.

30. The method of claim 27, further comprising identifying a state of a descriptor in a descriptor list of the second plurality of descriptor lists based on a validity flag value contained in the information fields.

31. The method of claim 27, further comprising determining a local update rate from values contained in the information fields.

32. The method of claim 27, further comprising smoothing isochronous data based on values contained in the information fields.

33. The method of claim 22, wherein the bus controller has a variable state, further comprising monitoring the state of the bus controller and sending update commands to the host computer when the state changes.

34. A computer readable medium containing instructions which, when executed on a host computer, the host computer in communication with a client computer, the host computer having a first plurality of descriptor lists of bus controller transfer commands, the client computer having a second plurality of descriptor lists and a bus controller that changes the second plurality of client descriptor lists, coordinates descriptor list updates, by:

receiving from the client computer update commands that, when executed, change the descriptor lists in the first plurality of descriptor lists in the same manner in which the bus controller changes the descriptor lists in the second plurality of descriptor lists; and performing the update commands.

35. A computer readable medium containing instructions which, when executed by a client computer, the client computer in communication with a host computer, the host computer having a first plurality of descriptor lists of bus controller transfer commands, the client computer having a bus controller and a second plurality of descriptor lists of bus controller transfer commands, coordinates descriptor list updates between the host computer and the client computer, by:

detecting changes occurring to the descriptor lists in the second plurality of descriptor lists; and sending to the host computer update commands that, when executed, change the descriptor lists in the first plurality of descriptor lists to be equivalent to the descriptor lists in the second plurality of descriptor lists.

36. An apparatus for coordinating descriptor list updates between a host computer and a client computer, the host computer in communication with a client computer, the host computer having a first plurality of descriptor lists of bus controller transfer commands, the client computer having a second plurality of descriptor lists and a bus controller that changes the second plurality of client descriptor lists, comprising:

means for receiving from the client computer update commands that, when executed, change the descriptor lists in the first plurality of descriptor lists in the same manner in which the bus controller changes the descriptor lists in the second plurality of descriptor lists; and means for performing the update commands.

37. An apparatus for coordinating descriptor list updates between a host computer and a client computer, the host computer in communication with a client computer, the host computer having a first plurality of descriptor lists of bus controller transfer commands, the client computer having a bus controller that changes a second plurality of client descriptor lists, comprising:

means for detecting changes occurring to the descriptor lists in the second plurality of descriptor lists; and means for sending to the host computer update commands that, when executed, change the descriptor lists in the first plurality of descriptor lists to be equivalent to the descriptor lists in the second plurality of descriptor lists.

* * * * *